(12) United States Patent
Klett et al.

(10) Patent No.: US 7,945,466 B2
(45) Date of Patent: May 17, 2011

(54) SCHEDULING SYSTEM

(75) Inventors: Robert D. Klett, Ottawa (CA); James R. Crozman, Ottawa (CA); Ingrid Bongartz, Ottawa (CA); Gelu V. Ticala, Stittsville (CA)

(73) Assignee: Kinaxis Holdings Inc. (CA)

( * ) Notice: Subject to any disclaimer, the term of this patent is extended or adjusted under 35 U.S.C. 154(b) by 0 days.

(21) Appl. No.: 12/400,532

(22) Filed: Mar. 9, 2009

(65) Prior Publication Data

US 2009/0171742 A1  Jul. 2, 2009

Related U.S. Application Data

(63) Continuation of application No. 11/155,297, filed on Jun. 17, 2005, now abandoned.

(60) Provisional application No. 60/580,581, filed on Jun. 17, 2004.

(51) Int. Cl.
*G06Q 10/00* (2006.01)

(52) U.S. Cl. ........... 705/7.23; 705/7.22; 705/7.12

(58) Field of Classification Search .......... 705/7.12, 705/7.22, 7.23
See application file for complete search history.

(56) References Cited

U.S. PATENT DOCUMENTS

| | | | | |
|---|---|---|---|---|
| 4,875,162 A | * | 10/1989 | Ferriter et al. | 705/29 |
| 5,040,123 A | * | 8/1991 | Barber et al. | 700/100 |
| 5,093,794 A | * | 3/1992 | Howie et al. | 700/100 |
| 5,890,134 A | * | 3/1999 | Fox | 705/9 |
| 2003/0216952 A1 | | 11/2003 | Klett et al. | |

FOREIGN PATENT DOCUMENTS

| | | |
|---|---|---|
| JP | 2000-322119 | 11/2000 |
| JP | 2001-100829 | 4/2001 |

* cited by examiner

*Primary Examiner* — Johnna R Loftis
(74) *Attorney, Agent, or Firm* — Wilmer Cutler; Pickering Hale & Dorr LLP.

(57) ABSTRACT

A scheduler combines characteristics of a forward and backward schedulers to determine a schedule for activities that require the use of resources. The system handles conflicting requirements for resources by considering target dates and the relative priority of the activities. As a result, higher priority activities are more likely to be scheduled to complete on or before their target date than are lower priority activities.

21 Claims, 7 Drawing Sheets

Figure 4

Input (Starting) Activity Elements

| Priority | Target Period | Quantity |
|---|---|---|

Calculated Activity Elements

| Earliest Resource Period | Latest Resource Period | Ready Period | Adjusted Ready Period | Balance |
|---|---|---|---|---|

| First Resource | Last Resource |
|---|---|

SCHEDULING SYSTEM

CROSS-REFERENCE TO RELATED APPLICATION

This application is a continuation of U.S. patent application Ser. No. 11/155,297, filed Jun. 17, 2005, which claims priority to Provisional Application Ser. No. 60/580,581, filed Jun. 17, 2004, all of which are incorporated herein by reference.

FIELD OF INVENTION

This invention relates to a scheduling system, e.g., for scheduling business operations and processes, supply chain planning and management, or manufacturing planning and management.

BACKGROUND

One approach for scheduling activities and resources with a scheduling system has been to use an optimization to determine a schedule. In this approach, an expression, generally called a cost function, is defined. The cost function processor computes a single quantity as a weighted sum of characteristics of the quality of the schedule. An optimization program is then run to find the schedule that results in the minimum or maximum value of the cost function. Such optimizers typically require many evaluations of potential solutions to find the optimal schedule, although some are designed to limit their number of iterations and find a good solution in less time. In any case, optimizers tend to require a considerable amount of time to run.

Another approach is generally known as heuristic scheduling. A heuristic scheduler employs a set of rules or a strategy to find a solution. Two known heuristic scheduling approaches are known as forward scheduling and a backward scheduling. In a forward scheduler, resources are allocated forward in time from some starting point. In a backward scheduler, resources are allocated first from a target date needed to complete on time, and if there are not enough resources available at that date, then resources are allocated at progressively earlier dates either until sufficient resources have been allocated or a starting limit is reached.

SUMMARY

Embodiments are disclosed for a scheduling system that combines characteristics of a forward and backward scheduler to determine a schedule for activities that require the use of resources. The processes and systems handle conflicting requirements for resources by considering target dates and the relative priority of the activities. The result is that higher priority activities are more likely to be scheduled to complete on or before their target date than are lower priority activities. Higher priority activities should be scheduled to be generally on time at the expense of lower priority activities.

A processor makes a number of passes through the set of activities as defined in storage. This number can be a predetermined number of passes, or can be determined based on a rule or criteria. The system can produce its schedule more quickly than in some prior systems. Other features and advantages will become apparent from the following detailed description, drawings, and claims.

BRIEF DESCRIPTION OF DRAWINGS

FIG. 4 is a block diagram showing input and calculated elements for an activity.

DETAILED DESCRIPTION

Figure 1:
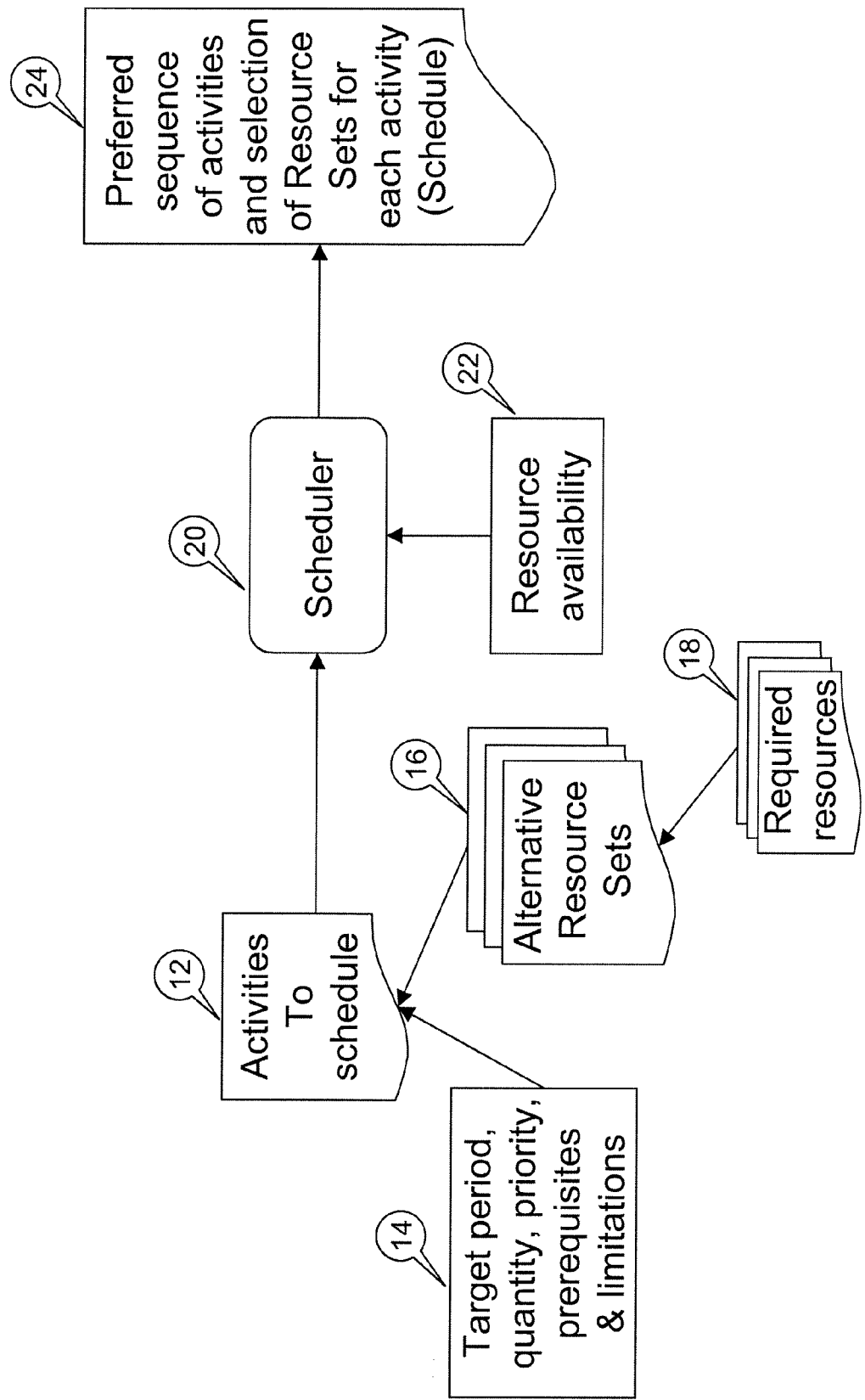
FIG. 1 is a block diagram of a scheduling system according to an embodiment described here.

Referring to FIG. 1, a problem to be addressed includes a set of activities to schedule 12 that require the use of one or more resources. Each activity to schedule 12 can have different types of information 14 associated with it and that serve as inputs to a scheduler 20, such as a target date, quantity, and other factors such as priorities, prerequisites, and limitations. Each activity can also have one or more associated alternate resource sets 16 that represent different ways and required resources 18 to satisfy (complete) an activity. The scheduler processes the activities 12, while considering the resource availability 22, to determine a preferred sequence of activities and selection of resource sets for processing the activities and which of the alternative resource sets to use for each activity. This preferred sequence is referred to here as schedule 24.

Activities and resources can vary significantly in kind and character, depending on the type of problem that is being addressed. A resource could be a vehicle or vessel in a shipping context, or a factory, production line, individual machine, or an individual in a manufacturing environment. Activities can include shipping, manufacturing, processing, testing, assembling, or any of a number activities, such as those in a manufacturing, shipping, or other business environment.

The scheduler can be implemented with a processor for processing data related to the activities and resources. The data, including data relating to activities and resources, is preferably kept in RAM memory, but could also be kept in any other suitable memory or storage for holding data such as magnetic or optical disks. The memory can be onsite or off-site and remote. The processing can be performed by any appropriate combination of processing hardware and software, including a suitably programmed general purpose computer, a special purpose computer, such as an application specific integrated circuit, or any other processor, controller, or logical array, whether implemented in a stand-alone computer, a network, a cluster of computers, or other configuration. Aspects of the scheduler that are implemented in software can be stored in any suitable computer-readable memory, including on a magnetic or optical disk. The resulting schedule can indicate the activities and resources, along with times the resources are used, and can be printed out, displayed on an interface, and/or provided to various locations with instructions as a result of the schedule. The effect of the scheduling system and process is an improved schedule that helps ensure that higher priority activities are performed on time.

Figure 2:
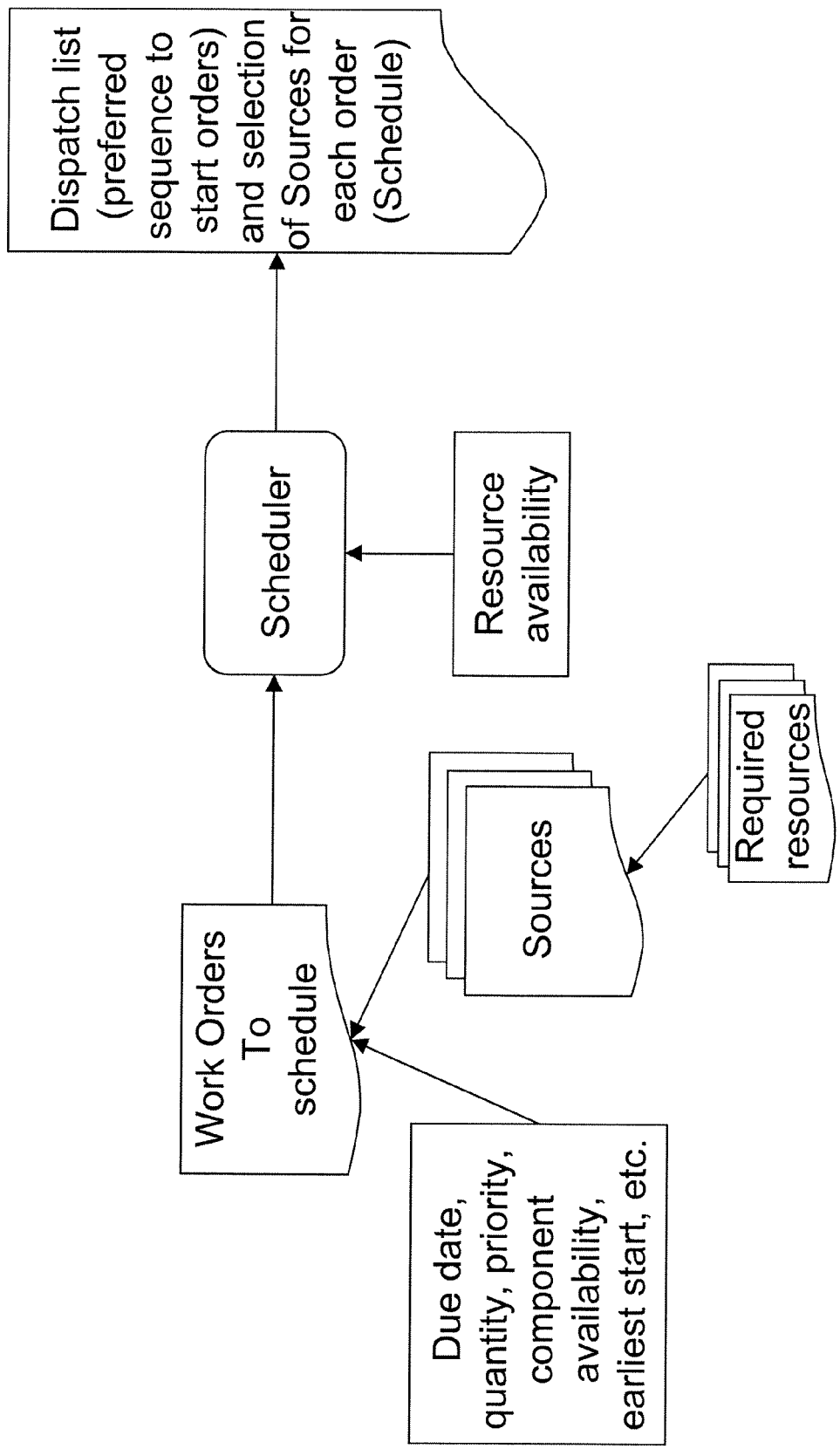
FIG. 2 is a block diagram showing a more specific example of the scheduling system shown in FIG. 1.

FIG. 2 is similar to FIG. 1 and shows an example of a scheduling system. In this example, the activities to be scheduled are work orders, the resource sets are sources and the information relating to the activities include due date, quantity, priority, component availability, and earliest start date. The scheduler schedules these activities along with the available resources to produce a dispatch list as the schedule.

The scheduling system here can be used to make products that are substantially unique, such as custom buses or large computer systems, or it can be used for making larger quantities of systems, such as personal computers or cellular telephones. These can be made in one way, a few defined ways, or can have many options. In the case of personal computers, for example, a company may offer many different options for a user, such as different sizes of hard drives, CD or DVD options, different preloaded software, different microprocessors and memory, and different types of housings. Scheduling can be used to coordinate when components arrive and how they are assembled and tested to meet desired due dates. The system can be used to schedule items made from individual components, and also for intermediate processing of subassemblies and combinations of components and subassemblies. A diagram of a configuration of components and subassemblies is shown, for example, in FIG. 2 of U.S. application Ser. No. 10/438,932, filed May 16, 2003, and published Nov. 20, 2003, the entirety of which application is hereby incorporated by reference.

The following information would typically be known in advance: the resources required by each alternative resource set, the date by which it is desired for the activity to be completed, and the availability of prerequisites and limitations to the activities. The system and process determine a schedule in an efficient manner. The schedule can further be re-calculated when an aspect of an activity or resource availability changes.

Figure 3:
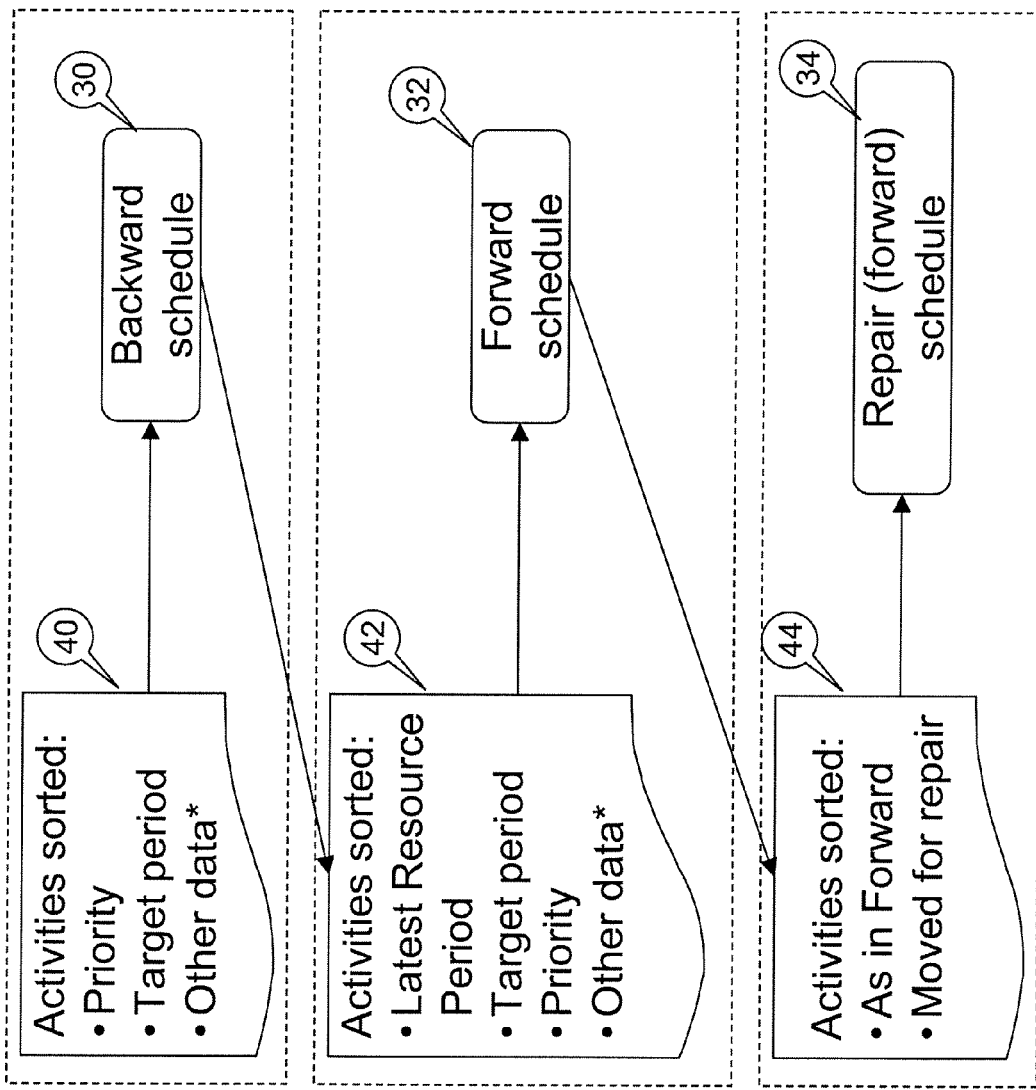
FIG. 3 is a block diagram showing scheduling steps for a scheduling process.

As shown in FIG. 3, in one embodiment, the system implements three processes, referred to here as a backward schedule process 30, a forward schedule process 32, and a repair schedule process 34 (which is essentially a forward process). Each of these processes is described separately below.

As shown in FIGS. 1 and 4, each of the activities to schedule 12 can have a set of information 14, including a target period, quantity, and priority, and can further have one or more prerequisites or other characteristics that can limit the earliest period in which resource can be allocated to it. An activity can have one or more alternative resource sets by which the activity can be completed, such as one of several manufacturing lines or machines. Each resource set has any number of associated required resources that are needed to complete that activity.

Figure 5:
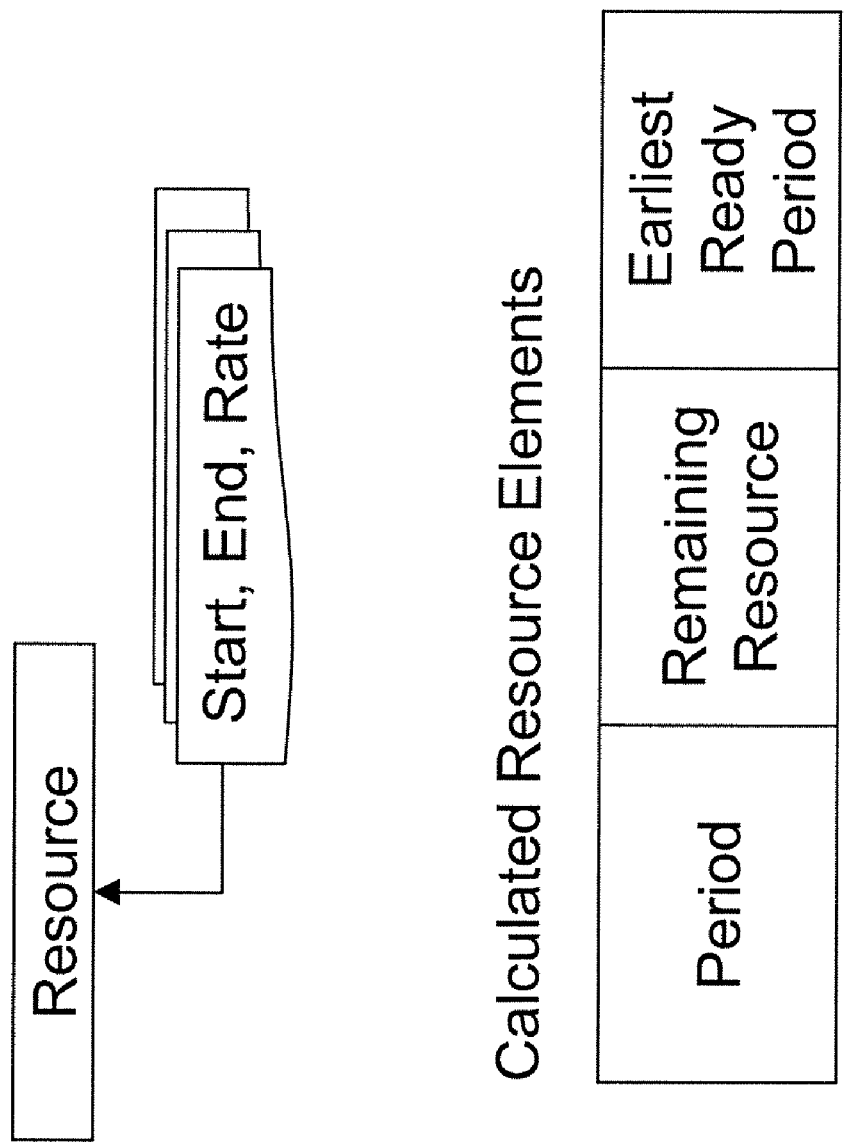
FIG. 5 is a block diagram showing inputs and calculated elements for a resource.

As shown in FIG. 5, each resource has associated with it a rate at which it is available. The rate can be expressed in one of a number of different ways, such as units per time or time per unit. The rate can change over time, e.g., from changing the number of hours worked per day, or the rate can be constant. To represent the availability of a resource, a set of resource available records is used. Each record defines a rate and may also define a start period and an end period for use of the resource. For any particular period, there can be an effective rate, which is the sum of all such records for the resources that include that period within their start and end periods.

When looking for more than one resource, control settings (rules) can determine how to handle requirements for more than one resource. Possible rules include (1) a minimum amount of every resource is required before any resource can be used in a period, (2) resources can be allocated whenever any resource is available, (3) resources are allocated in a particular sequence, (4) resources may be allocated simultaneously across each resource only in the same amount for each resource, and/or (5) combinations of the above choices.

In performing the scheduling function, it may be the case that not every activity can be completed by the desired due date. In such a case, however, it is desirable to try to insure that relatively higher priority items are completed on time by the desired due date, and that relatively lower priority items are the ones that are allowed to be late. For example, some items may have a firm and necessary due date, while others may have a desirable date that is not necessarily required.

Backward Schedule

Referring to FIG. 3, backward schedule process 30 determines when some activity should be scheduled and determines a feasible date for each activity. This system is referred to as "backward" because it uses as its starting perspective a backward approach where it looks to the desired date of completion, and works backward to the last possible date that an activity can be started to meet the required completion date. This date can be further adjusted backward as needed, and there can be some iterative processing back through the layers of activities that need to be performed.

As shown in FIG. 3, the activities to be scheduled are sorted into a list referred to here as a Priority List 40. This list is sorted by:

Priority. One or more characteristics of the activity that determine a relative priority for an activity. More than one activity can have the same priority. Priorities should be sortable so that higher priority activities are seen before lower priority activities.

Target Period. The latest period in which resources could be allocated to the activity and still have the activity complete on time. A period can be any defined time, such as a day, hour, or minute.

Other data. Use additional keys for sorting to ensure that the activities will be processed in the same order if the scheduler is re-run. The additional sort keys can be used to ensure that there is a unique sort order for the activities or that duplicates are truly indistinguishable from each other.

As an example, several activities could have a priority defined as 1s, while others can have priority defined as 2s or 3s. The list is arranged so that the is are listed first, and within each of the 1s, the activities are arranged by Target Period, starting with the earliest target. Other data can be provided as desired as a further sort following the Target Period.

Referring also to FIG. 4, additional data is calculated and associated with each activity as part of the backward schedule process. This data will later be sorted with a Latest List 42 for use by the forward schedule process 32. The data includes:

Earliest Resource Period: the earliest period that backward scheduling tried to find resources for this activity. This period is initialized to be the Target Period (the latest period to start and be on time).

Latest Resource Period: the later of the Target Period and the last period from which resources were allocated to this activity. Because the Target Period is the latest period in which resources could be allocated to the activity and still have the activity complete on time, if the Latest Resource Period is after the Target Period, it indicates that the activity will not be performed on time.

Ready Period: the earliest period in which resources can be allocated to the activity. For example, this includes the period in which prerequisite activities are completed, components are available, any limiting periods are passed, etc.

Adjusted Ready Period: the earliest that this activity could have resources allocated to it in backward scheduling. This period is initialized to be the Ready Period. The Adjusted Ready Period is tracked as the activity is processed to search for resources to perform the activity. If the activity is processed to look to certain resources and finds insufficient resources available, but there is an earlier Earliest Ready Period (see below) for another activity, then the other activity that used that resource could be scheduled earlier, allowing the current activity to be scheduled in the desired period. In the backward schedule, the system will try to allocate a resource to the current activity in an earlier period, expecting that the forward scheduler will actually schedule the other activity there instead.

Balance: the quantity represents the amount of resources that are still needed by the activity. If resources are allowed to be allocated other than simultaneously, then the balance can be an array of balances, one for each of the resources required. The Balance quantity is initialized with the quantity associated with the activity, and is reduced as resources are allocated to the activity.

Referring to FIG. 5, resources take as inputs start, end, and rate of availability, and the following data is calculated and associated with each resource for each period:

Period: a time-stamp indicating the beginning of a period for which the resource can be allocated.

Remaining Resource: the amount of the resource that remains to be allocated in this period. If the resource can process 1,000 units per period and it has been scheduled for one activity to process 400 units for some period, the remaining resource to be allocated in the period would be 600 units. This amount is initialized with the sum of the rates applicable to the period.

Earliest Ready Period: used to track the earliest that resource could have been allocated to an activity that tried to obtain resource in this period. This period is initialized as any period on or after Period. In one implementation, it can be initialized with a special value indicating "Future".

The calculated elements are first initialized for the activities and resources, using the initial values identified above.

Assuming there is exactly one Alternative Resource Set for an activity, the backward scheduling starts with the first activity in Priority List 40 (FIG. 3). Starting at the later of the Adjusted Ready Period (the earliest the activity could have a resource allocated to it) and the Target Period (the latest period to allocate the resource to allow on-time completion), resources are allocated to that activity.

When looking for a resource in a desired period, the Adjusted Ready Period for the activity and the Earliest Ready Period (the earliest a resource could have been allocated) for the resource are tracked. That is, when trying to find a resource to allocate, if the resource's Earliest Ready Period is before the activity's Adjusted Ready Period, then the system replaces the activity's Adjusted Ready Period with the resource's Earliest Ready Period. Similarly, if the activity's Adjusted Ready Period is before the resource's Earliest Ready Period, the Earliest Ready Period is updated. In effect, this tracking pushes back the date to the earliest date that the resource is ready for the activity and the activity is ready for the resource.

For a given activity, when a period is found that has Remaining Resource that can be allocated to the activity, the Remaining Resource for use by other activities is reduced by the amount allocated and the activity Balance (array entry if resource is not allocated simultaneously) for the activity is reduced by the quantity allocated. If the current period in which resource is allocated to the activity is before Earliest Resource Period, the Earliest Resource Period is set to the current period. As noted above, this Earliest Resource Period is initialized to the Target Period and moved back as allowed. If the current period in which the resource is allocated to the activity is after the Latest Resource Period, the Latest Resource Period is set to the current period.

If a Balance of resources needed by an activity remains and if the Adjusted Ready Period is before both the current period and the Earliest Resource Period, the system continues trying to allocate resources in the previous period. If a Balance remains and the Earliest Resource Period is on or before the Adjusted Ready Period, then the system looks for a resource in the period after the Latest Resource Period.

This process continues until either the activity has been fully satisfied (i.e., the Balance=0) or there is at least one resource with no Remaining Resource that can be used by this activity. In the latter case, the Latest Resource Period is set to indicate that the activity was not satisfied. In the preferred implementation, the period is set to a value that indicates "Future".

The next activity in the Priority List 40 is selected, and the backward scheduling process is repeated. This process is repeated until all the activities have been processed. The system then proceeds to the forward scheduling process once all the activities using the current set of resources have been processed by backward scheduling.

When more than one Alternative Resource Set is available to satisfy an activity, there are a few desired changes in the backward scheduling process so the system can determine which set(s) to use and the quantity of the activity to allocate to each.

In the case with more than one Alternative Resource Set, backward scheduling starts with the first activity in Priority List 40 (FIG. 3). Subject to any limitations, the ability of each of the Alternative Resource Sets to satisfy some portion of the activity is checked for the later of its Ready Period and its Target Period (referred to here as the Working Period). Subject to the availability of each set, one Alternative Resource Set is selected on the basis of the following ordered possibilities of when resources are available for the activity: (a) resources are available for the activity in its Working Period, (b) resources are available closest before its Working Period, or (c) resources are available soonest after its Working Period. The period in which the selected Alternative Resource Set has resources available is called the Resource Period. Resources are allocated to the activity using the selected Alternative Resource Set in the Resource Period. As when allocating resource with one Alternative Resource Set, the Adjusted Ready Period for the activity and the Earliest Ready Period for the resource are tracked.

As long as an unsatisfied balance exists for an activity, the process is repeated by testing the ability of each of the Alternative Resource Sets to satisfy some portion of the activity. The amount of the activity satisfied by each Alternative Resource Set is maintained. Forward scheduling treats each portion of the activity allocated to the same Alternative Resource as the same activity and each portion allocated to a different Alternative Resource Set as a distinct activity.

The process continues selecting among the Alternative Resource Sets and allocating resource for the next activity until all the activities are done.

Forward Schedule

The emphasis of the backward scheduling is on making sure that activities can be completed on time if possible. The forward scheduling process determines which activity should be scheduled first, using the results of backward scheduling to determine when any activity should be scheduled and then to determine which activity to schedule next in order to prevent lateness if possible.

The activity Balances and Remaining Resource data are re-initialized. As shown in FIG. 3, the activities are re-sorted. If an activity is allocated to more than one Alternative Resource Set, there can be more activities to schedule in the forward schedule than in the backward schedule. The resulting Latest List 42, is sorted by Latest Resource Period, Target Period, Priority, and any other desired data as used in backward scheduling.

Using the Latest List, the Earliest Resource Period is manipulated to identify scheduling zones. The activity at the end of the list (that is, the activity with the last Latest Resource Period) is selected. If the Latest Resource Period is after its Target Period, it was scheduled late. A Current Zone is set to be equal to that activity's Earliest Resource Period. The forward scheduler works through the list, once for each resource used by activities in the list.

For each activity that uses the selected resource, if its Earliest Resource Period is later than the Current Zone, the Earliest Resource Period is reset to the Current Zone to allocate the resource earlier. If the Earliest Resource Period is before Current Zone, then the Current Zone is reset to Earliest Resource Period.

The Zone process is repeated until either no changes are required or no activities are skipped (for example, if all the activities use all the resources). This process groups activities into scheduling zones, where the activities may be consecutive or overlapping. Once the Zones have been defined, the main portion of forward scheduling is performed. Forward scheduling starts with the first activity in the Latest List (that is, the activity with the earliest Latest Resource Period). Because the backward scheduling process started with the earliest highest priority activities, the forward scheduling process starts with a bias toward earlier completion of higher priority activities. Resources are allocated to that activity, starting at the later of the activity's Ready Period and its Earliest Resource Period (Zone). When allocating a resource during the forward scheduling process, the activity Balance and the Remaining Resource are reduced by the amount of the resource that is allocated. If there is not enough resource in a given period, continue to a next period until the activity is satisfied (or an end-limit is reached for the activity or no more Remaining Resource exists for a resource).

Each activity is processed until all the activities have been scheduled. It is possible that a resource in a period may be partially or fully allocated to previously scheduled activities before an activity is scheduled that looks for resource in that period. In that case, there could be a gap between allocations to that later activity.

While allocating resources, it is possible that an allocation is made later than the Latest Resource Period for that activity. When this happens, this activity and its resource allocation are a candidate for the repair process identified below. The process continues to allocate resources to that activity, but it tests for lower priority activities with the same Earliest Resource Period (Zone), as described below.

Repair

The repair step is designed to try to correct any scheduling deemed to be "poor" that may have been made in the forward schedule process. Particularly in situations where multiple resources are required, it is possible that the forward schedule can result in high priority activities being scheduled unnecessarily late.

The forward schedule step identified cases where an activity was scheduled later than its Latest Resource Period (this is the Late Activity). If any activity, with lower Priority and Target Date, has been scheduled before the Late Activity with the same Latest Resource Period as the late Activity (in the same Zone), then every such activity is moved to immediately follow the Late Activity in the Repair list, retaining the relative sequence if more than one activity is moved.

A final forward schedule is then performed using a Repaired Forward Schedule list 44 (FIG. 3). The preferred implementation performs a single repair step. More than one repair step could be performed to provide somewhat improved schedules at the expense of longer processing time.

The First Resource and Last Resource used for each activity and each allocation of resource to an activity are tracked. These define the actual schedule.

Figure 6:
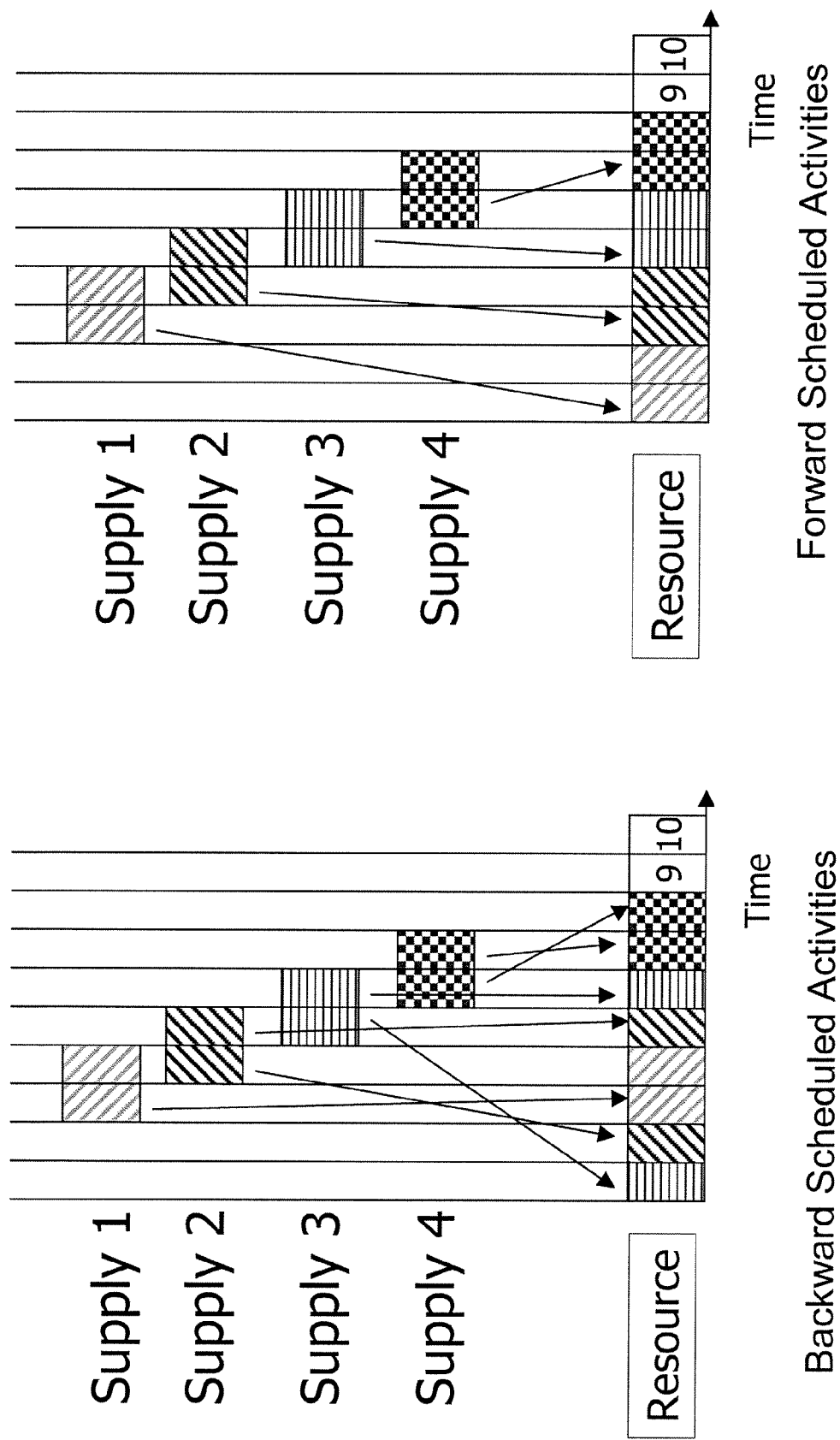
FIG. 6 shows results typical from using a backward scheduler and from using a forward scheduler.

FIG. 6 shows an example of results of a backward scheduling process versus a forward scheduling process on a situation with four supplies shown without any priority ranking, but indicating the due date. Because there are eight periods of resource needed to accomplish the task over seven periods, some task has to be late. The forward scheduling process allocates the resource to the supplies in the order of their due date. The backward scheduling process tries to make sure that each supply is allocated at least some resource no later than its due date. In each case, Supply 4 is late.

Figure 7:
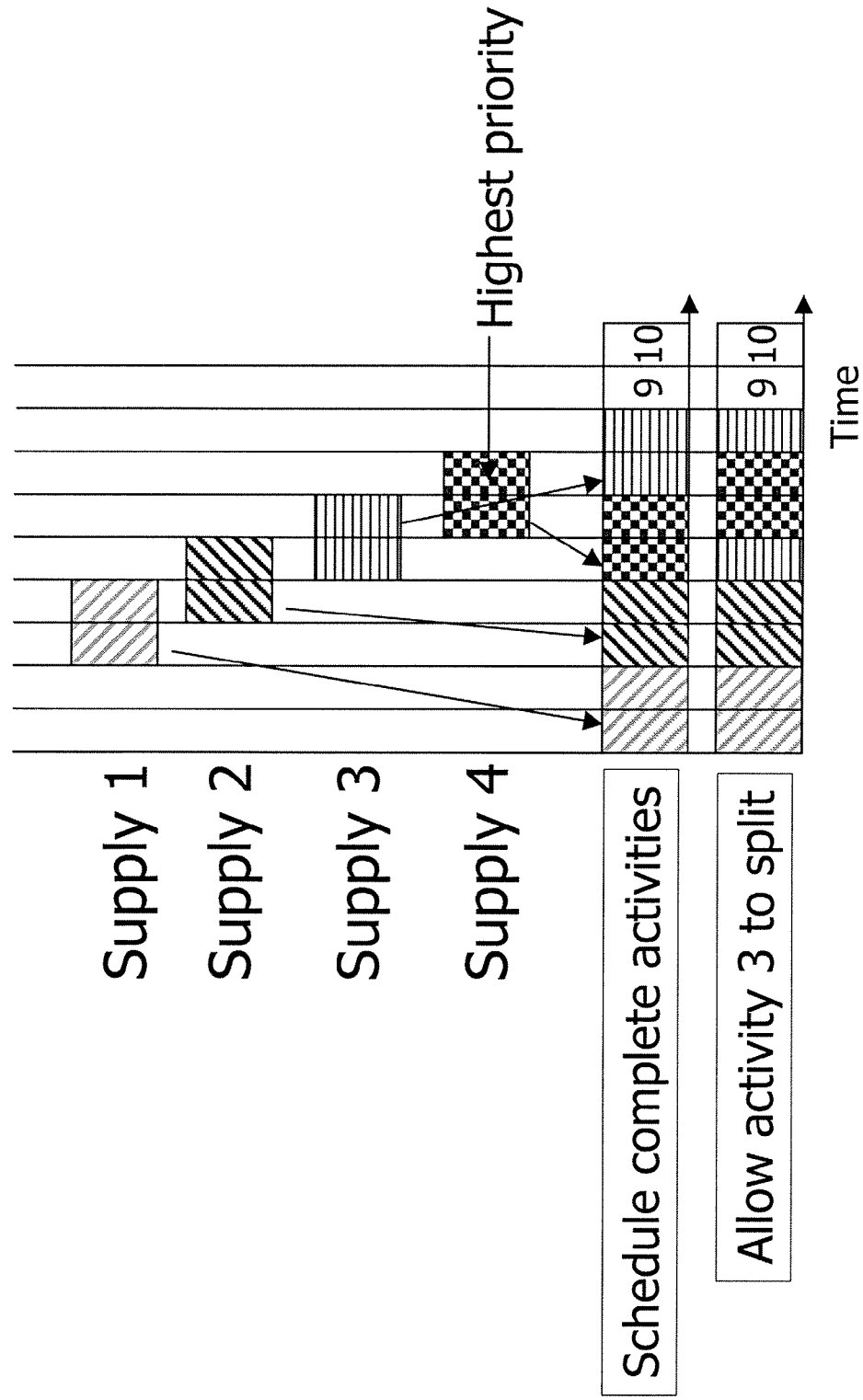
FIG. 7 is a diagram showing the results from a combination of backward and forward scheduling when priority does not correspond to date sequence and some amount of lateness is unavoidable. It also compares the schedule resulting from splitting a late activity (not contiguous) and not splitting it.

FIG. 7 illustrates a variation when activities have priorities that are out of sequence with their target dates. In this case, Supply 4 is deemed to have a higher priority than Supply 1 through Supply 3. The combination of backward and forward scheduling results in a schedule that favors the higher priority orders (Supply 4) being on time and also schedules activities with earlier target dates before those with later target dates if doing so does not make higher priority activities late. FIG. 7 shows two variations—one in which the activity must be kept together, and one in which the activities can each be split in half. Splitting allows half of the activity for Supply 3 to be done on time.

The scheduling systems and variations described above and below can be used to perform scheduling for all activities and resources at one time for a given item. Alternatively, the scheduling can be performed for different phases separately. For example, an item made of sub-assemblies and sub-sub-assemblies can be scheduled by grouping different stages of the overall process together and performing the scheduling of each group separately. By performing the schedule in different groups, a number of schedules can be created and combined for a single item. In addition to a grouping by earlier and later stages of an item, schedules can be provided for separate tracks that lead to a final item. For example, if an item is made up of 5 sub-assemblies, scheduling can be performed for the stage from the 5 sub-assemblies to the final product. Then, a schedule can be created for each of the sub-assemblies with backward and forward scheduling for each of the sub-assemblies to make sure that they are completed on time for the final assembly.

While the amount of resource required by an activity has been described as the same as the quantity associated with the activity, a factor can be added to the Resource definition for each activity so that different quantities are required for each resource.

In backward scheduling, the activity quantity can be split at the time when backward searching fails to find enough resource (as shown, for example, in FIG. 7). That is, when looking for a resource after the current Latest Resource Period, split the activity into one that has resource allocated to it on time and another that is satisfied late. This allows a portion of the activity to complete on time, rather than all of it being late.

The process described above uses an approach to schedule activities as late as possible to meet their target period. However, an optional approach is to schedule as early as possible.

In this case, at the end of backward scheduling set Earliest Resource Period to a period equal to today or some period in the past. Then, all the activities will be in the same Zone and will be scheduled as early as possible.

While there can be some benefit to providing just a backward scheduling process as described above and a forwarding process as needed, the system preferably works by always proceeding directly from the backward scheduling process to the forwarding process without any intermediate assessment step to confirm the results of the backward schedule process first; i.e., in one embodiment, the backward scheduling process is not considered to be a stand-alone process, but is one step in an integrated process. The repair processing step could be performed on an as-needed basis based on some rule or criteria.

The systems and methods described here can be used in any situation in which activities are to be scheduled subject to the availability of materials and resources, where the time to respond is more important than the absolute quality of the schedule, and where the availability of resource can be described as a time-varying rate. Examples of such situations include project management, supply chain, and factory production scheduling. The systems and methods can be extended to handle a maximum capacity of resource in isolation or in addition to the time-varying rate.

Having described embodiments, it should be apparent that modifications can be made without departing from the scope of the invention as defined by the appended claims.

What is claimed is:

1. A method for scheduling comprising:
   receiving information relating to activities to be performed and information relating to the availability of resources needed to perform the activities; and
   processing the information with a processor to create a schedule with a sequence of activities and a selection of resources for each activity, including:
   performing a backward scheduling process to schedule activities based on a target period defined for each activity as a last time that each activity can be started to meet a desired completion time for the activity, the backward scheduling process starting with activities that have earlier target periods, and further determining the availability of resources to perform the activities for each of a number of time periods, the backward scheduling process producing a list of activities arranged at least in part based on a latest resource period defined for each activity as a later of the target period and latest period resources have been allocated to the activity, and
   automatically proceeding from the backward scheduling process to a forward scheduling process using the results of the backward scheduling process, including defining a scheduling zone for a set of activities that use a resource, with activities to be performed during each zone and determining an order in which the activities should be scheduled during each zone starting with activities with earlier latest resource periods and allocating resources forward in time.

2. The method of claim 1, wherein for each activity a priority is defined and the backward scheduling process further includes first sorting the activities by priority and starting the backward scheduling process with the activities that have higher priorities and for each group of activities with the same priority, with the activities that have earlier target periods.

3. The method of claim 1, wherein each resource takes as inputs start, end, and rate of availability, wherein the rate can vary over time.

4. The method of claim 1, wherein there is a single alternative resource set for each activity.

5. The method of claim 1, wherein there are multiple alternative resource sets to satisfy an activity.

6. The method of claim 5, wherein, as long as there is an unsatisfied balance of resources required for an activity, the process is repeated by testing the ability of each of the alternative resource sets to satisfy some portion of the activity.

7. The method of claim 1, wherein, for each zone, the forward scheduling process allocates resources to an activity starting at the later of the earliest period in which the resource can be allocated the activity (ready period) and the earliest period the backward scheduling process tried to allocate the resource to any activity within the zone (earliest resource period).

8. The method of claim 1, further comprising determining whether an activity with a higher priority was scheduled later than the target period and thus is a late activity, and if one or more activities with lower priority have been scheduled before the late activity within the same zone as the late activity, then repeating forward scheduling having first moved such one or more lower priority activities to follow the late activity in the list of activities to forward schedule.

9. The method of claim 1, wherein activities can use resources at different rates.

10. The method of claim 1, further comprising, in response to a determination that an activity will be completed late, splitting the times during which resources are allocated to the activity such that a portion of the activity is completed on time.

11. The method of claim 1, further comprising:
    after the forward scheduling process, determining whether an activity with a higher priority was scheduled later than its target period and thus is a late activity, and if an activity with a lower priority and target period has been scheduled before the late activity within the same zone as the late activity, then repeating forward scheduling having moved every such lower priority activity to follow the late activity in the list of activities to schedule.

12. The method of claim 11, wherein the backward scheduling process further includes first sorting the activities by relative priority level and starting the backward scheduling process with the activities that have higher priorities and for each group of activities with the same priority, with the activities that have earlier target periods.

13. The method of claim 1, wherein for each activity there is a ready period defined as the earliest period a resource can be allocated to the activity, and wherein during the backward scheduling process for each activity to be scheduled, the time period is moved backward down to an adjusted ready period, which is the earliest ready period among all activities that have been already scheduled and have used the same resource as the activity to be scheduled.

14. The method of claim 1, wherein at the end of the backward scheduling process for each activity, if the activity to be scheduled still requires more resources, then the processor attempts to allocate resources during time periods after the target period.

15. The method of claim 1, wherein at the end of the backward scheduling process some activities that still require more resources and some activities that have been scheduled later than the target period are flagged, and wherein during the forward scheduling process a scheduling zone is defined for each set of activities that use a resource that is also used by a flagged activity.

16. A scheduling system comprising:
storage for storing information relating to activities to be performed and to the availability of resources needed to perform the activities; and
a processor for processing the information to create a schedule with a sequence of activities and a selection of resources for each activity, the processing including:
  performing a backward scheduling process to schedule activities based on a desired completion time for each activity for producing a list of activities arranged at least in part based on a target period for each activity indicating the time that the activity is to be started to be completed on time, the backward scheduling process starting with activities that have earlier target periods, and determining for each activity a latest resource period defined as a later of the target period and a latest period resources have been allocated to the activity, and
  automatically proceeding from the backward scheduling process to a forward scheduling process using the results of the backward scheduling process including defining a scheduling zone for each set of activities that use a resource, with activities to be performed during each zone and determining an order in which the activities should be scheduled during each zone starting with activities with earlier latest resource periods and allocating resources forward in time.

17. The system of claim 16, wherein for each activity a priority is defined and during the backward scheduling process the processor first sorts the activities by priority and starts the backward scheduling process with the activities that have higher priorities and for each group of activities with the same priority, with the activities that have earlier target periods.

18. The system of claim 16, wherein the processor schedules for a single alternative resource set for each activity.

19. The system of claim 16, wherein the processor schedules for multiple alternative resource sets to satisfy an activity.

20. The system of claim 16, wherein the processor further determines whether an activity with a higher priority was scheduled later than the target period and thus is a late activity, and if one or more activities with lower priority have been scheduled before the late activity within the same zone as the late activity, then moving such one or more lower priority activities to follow the late activity.

21. The system of claim 16, wherein the processor, in response to a determination that an activity will be completed late, splits the times during which resources are allocated to the activity such that a portion of the activity is completed on time.

* * * * *